United States Patent [19]

Utsugi

[11] Patent Number: 4,684,229

[45] Date of Patent: Aug. 4, 1987

[54] PHOTOGRAPHIC CAMERA

[75] Inventor: Mikio Utsugi, Tokyo, Japan

[73] Assignee: Fuji Photo Film Co., Ltd., Kanagawa, Japan

[21] Appl. No.: 782,594

[22] Filed: Sep. 30, 1985

[30] Foreign Application Priority Data

Oct. 1, 1984 [JP] Japan .................................. 59-147279
Oct. 1, 1984 [JP] Japan .................................. 59-147280

[51] Int. Cl.$^4$ .......................... G03B 17/24; G03B 7/00
[52] U.S. Cl. ..................................... 354/106; 354/410
[58] Field of Search ......... 354/106, 109, 410, 202 FF; 355/40

[56] References Cited

U.S. PATENT DOCUMENTS

| 3,736,856 | 6/1973 | Grossmann et al. | 354/106 X |
| 4,168,894 | 9/1979 | Adolph | 354/109 X |
| 4,211,558 | 7/1980 | Oguchi et al. | 354/109 X |
| 4,249,815 | 2/1981 | Burkholder | 354/202 FF X |
| 4,344,683 | 8/1982 | Stemme | 355/40 X |

Primary Examiner—Donald A. Griffin
Attorney, Agent, or Firm—Young & Thompson

[57] ABSTRACT

A camera comprises an exposure frame for defining an exposure aperture in the camera body, an automatic film winding device incorporated in the camera body, and a light emitting element disposed at the exposure frame. The light emitting element is controlled to emit light to which a loaded film is exposed as the film is advanced by the automatic film winding device. The film provided by the camera, after development, shows a visible image of various line marks produced by the light emitting element which indicate that the film or a portion of frames on the film have been exposed under a certain mode of operation of the camera. The line mark is detected when picture images on the film are magnetically recorded on a magnetic sheet. The magnetic sheet is transferred to a reproducing apparatus in order to display the picture image on a TV screen in one of a variety of ways according to the line marks.

12 Claims, 9 Drawing Figures

1

PHOTOGRAPHIC CAMERA

BACKGROUND OF THE INVENTION

1. Field of the Invention

The present invention relates to a photographic camera and more particularly, to a camera which is suitable for recording a number of negative images on roll film, the negative images then being recorded on a magnetic sheet which is put on a player for reproducing the images on a CRT screen.

2. Description of the Prior Art

Electronic still cameras which have been recently developed use a magnetic sheet standardized as a still video floppy to be disposed therein in place of conventional photosensitive film having at least an emulsion layer being made of silver halide. The optical image formed by the taking lens is converted into video signals so as to be recorded on the magnetic sheet in the camera. The magnetic sheet thus provided may be transferred to reproducing equipment in order to view the images on a CRT screen. The standardized magnetic sheet includes 50 available tracks, each one being assigned to a file image.

Such electronic image recording and reproducing systems as mentioned above, having a great difference from the conventional photosensitive film cameras, can not only eliminate darkroom film processing but also permit viewing of the photographed images instantaneously on general TV screens with ease, and furthermore permit displaying a successive action sequence of still images.

The above-mentioned electronic still camera is, however, prohibited, in view of manufacturing cost and weight, from using high quality image pick-up tubes or solid state imaging. A particular problem for the practical application of the electronic still cameras has been the improvement of image quality and resolution.

As a way of solving the problem, it has been proposed to use conventional silver halide photosensitive films and conventional still cameras in order to obtain good quality and high resolution images. In that way, the photographic film on which a number of latent images are formed may be processed at the photofinishing laboratory, professionally, using high performance image pick-up equipment. By this method, negative images are converted into video signals for recording onto a magnetic sheet. The magnetic sheet thus provided in the photofinishing laboratory may be transferred to reproducing apparatus so as to display the images on a TV screen. By such a method, images on the photographic film can be easily recorded on a standard magnetic sheet having the same format as used in electronic still cameras, and the images can be reproduced by use of the reproducing apparatus of the electronic still camera system.

The above-mentioned electronic image reproducing system has a particular feature that a series of still images can be successively reproduced and displayed on a TV screen by successively shifting the magnetic head so as to regenerate signals recorded on tracks on the magnetic sheet which is continuously rotated at high speed. Corresponding to the shift of the magnetic head, different still images are displayed on the TV screen one after another.

Therefore, when a series of still pictures on the photographic film are action sequences which can be taken by repeatedly firing the shutter and winding automatically at a firing rate between, for example, one and six frames per second, it is possible to reproduce the action in either slow motion mode or stop motion mode for action analysis by changing the shifting interval of the magnetic head.

However, for such a changing operation, it is necessary to find the first one of the series of successive pictures while viewing the reproduced images on the TV screen. A further requirement is to return the interval to an ordinal one. These inconveniences make usage troublesome.

These changing operations may be eliminated by recording detectable action signals on the respective tracks of the magnetic sheet. The action signals indicate that the image to be reproduced is a part of a series of successive images and further indicate the firing rate at which the picture corresponding to the image to be reproduced has been photographed. The respective signals are employed to automatically change the shifting rate of the magnetic head when reproducing the images. However, it is hard for processing dealers to judge whether and on which tracks such signals should be recorded when editing the magnetic sheet from the film on which a number of pictures are formed.

There has recently been proposed 35 mm compact cameras of the type known as prewinding cameras using the 135 size roll films, which are adapted to wind entirely the loaded roll film around the take-up spool before exposure. In such cameras, the roll film is automatically rewound by one frame every exposure. The significant feature of such cameras is to expose the roll film in the reverse order to the frame number, i.e. the last frame first. Consequently, when the roll film having frames exposed in the reverse order of frame number is supplied to the processing dealer for transfer to a magnetic sheet on which images formed on the roll film, after development, are magnetically recorded in such a way as mentioned above, the images are recorded in the reverse order of exposure, i.e. in the order of frame number on the magnetic sheet. As a result, the images will be reproduced in the reverse order of exposure. As described above, a particular problem is that the magnetic sheet from the film provided by the prewinding camera cannot reproduce the picture images in order of time sequence.

SUMMARY OF THE INVENTION

It is accordingly an object of the present invention to provide a camera suitable for exposing film, the picture images formed on which, after development, are magnetically recorded on a magnetic sheet from which the picture images are reproduced and displayed on a CRT screen.

Another object of the present invention is to provide a camera which can register the information of operation mode of the camera on a film which then dictates the condition under which the picture images formed on the film are recorded on a magnetic sheet from which the picture images are subsequently reproduced and displayed on a CRT screen.

Still another object of the present invention is to provide a camera which can provide the information of operation mode of the camera on a film which is subsequently recorded on a magnetic sheet simultaneously with the picture images on the film after development in order to indicate the condition under which the picture images are to be reproduced and displayed on a CRT screen.

A further object of the present invention is to provide a camera capable of providing the information of operation mode of the camera which is structurally simple and manufactured at low cost.

To attain the above-mentioned objects, this invention provides a camera comprising a light emitting means disposed at the exposure frame of the camera for emitting light with which the periphery of the loaded film can be illuminated so as to form an optical mark or signal as a latent image and control means for allowing the light emitting means to emit light for a predetermined period of time.

According to an embodiment of the present invention which is applied to a camera having a prewinding function in which the film loaded therein is fully wound around a spool just after loading the film, the control means is actuated at the completion of film loading so as to expose the marginal portion of the first several frames of the film to the light from the light emitting means. The film is then exposed to take pictures in the reverse order of frame number. The film thus exposed will, after development, show a visible line mark on the leading portion thereof which indicates that the frames in numerical order are arranged in the reverse order of exposures, i.e. in the reverse order of the progress of time or that the film has been exposed in the prewinding mode. When the film having the line mark is sent to the photofinishing laboratory in order to record the picture images on a magnetic sheet, the laboratory can easily judge that the picture images should be recorded in the reverse order of the numerical number of frames.

According to another preferred embodiment of the invention which is applied to a camera having a continuous shooting function which can allow the camera to take a series of successive pictures such as action sequences by firing the shutter and winding the film at a certain firing rate while the shutter button is kept depressed, the control means is actuated in association with the film winding operation so as to expose the marginal portion of the frames of the film corresponding to a series of successive picture images to the light from the light emitting means. The film including a series of successive picture frames will show a visible line mark on the marginal portion of the frames of the film which indicates that the frames are action sequences taken in the continuous shooting mode. When the picture images on the film are recorded on the concentric circular tracks of a magnetic sheet, the line mark is simultaneously recorded as magnetic signals on the tracks where the series of successive picture images are recorded. According to the presence of the signals corresponding to the line mark, the series of successive picture images can be reproduced in either slow motion or stopped motion.

Details of the camera according to the present invention will be apparent to those skilled in the art from reading the following description when taken in conjunction with the accompanying drawings.

DETAILED DESCRIPTION OF THE INVENTION

Figure 1:
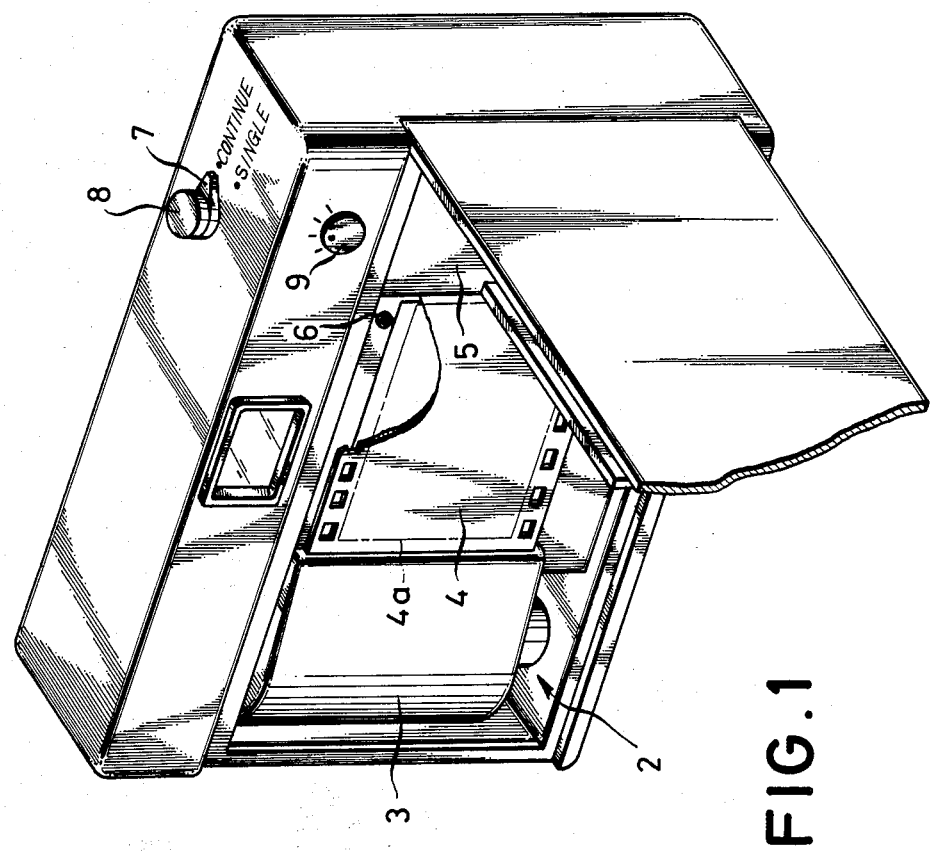
FIG. 1 is a schematic perspective view of a camera according to a first embodiment of this invention.

Referring now to FIG. 1 to describe a first embodiment of the present invention, there is shown, from the rear, a camera with the back cover opened. The camera includes a film loading chamber 2 for accommodating a roll film container 3 with a leader of the film previously withdrawn out therefrom. On closing the back cover, the camera automatically winds the leader of the film 4 up around a take-up spool (not shown) rotatably mounted in a film take-up chamber 5 in a well known manner. Facing the upper marginal portion of the film 4, there is provided in the camera body an illuminating means comprising, for example, a light emitting diode 6 (LED) which can illuminate the upper marginal portion outside the picture frame 4a with light to which the film is sensitive. LED 6 is energized to emit light according to one of the camera operation modes to which the camera is selectively set with a mode set lever 7, and the operation of the shutter release button 8, which will be described in detail later. In addition, LED 6 is controlled to continually emit light of a certain duration according to time intervals which can be selectively set by a time set dial 9 and with which the camera can take pictures successively when the camera is in the continuous mode (in this mode, continuous shootings can be effected while keeping the shutter release button 8 depressed).

Figure 2:
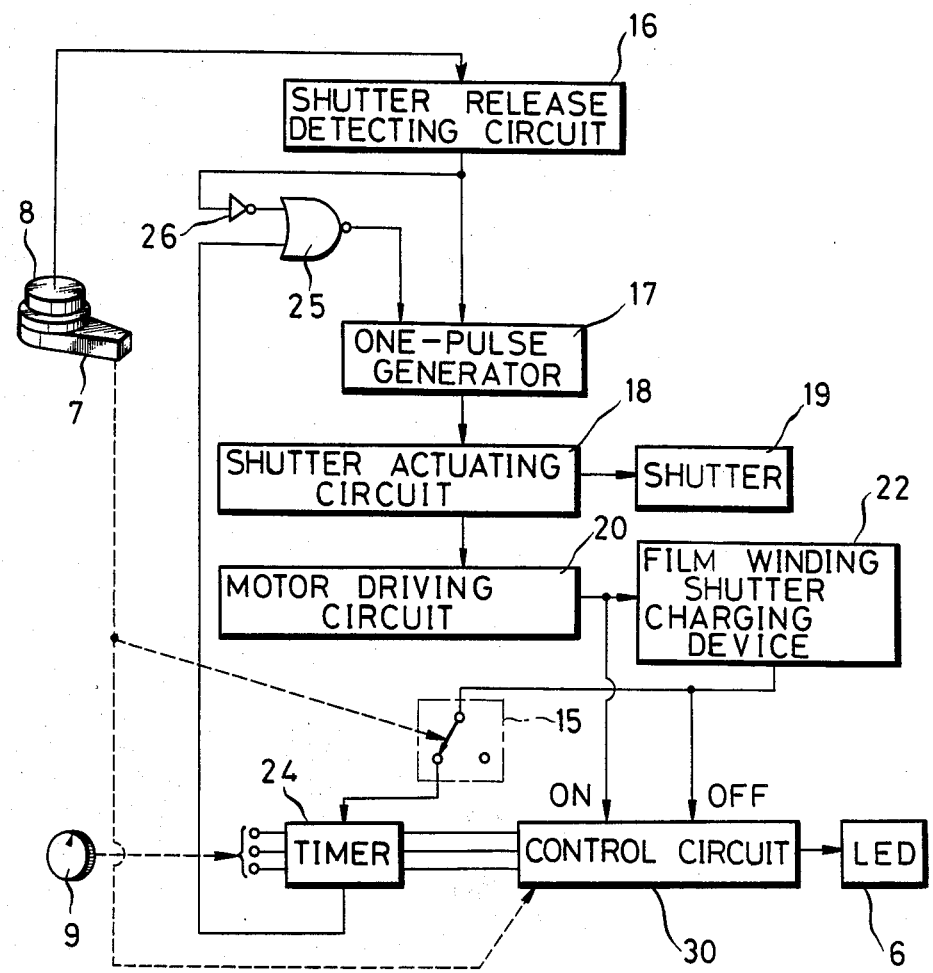
FIG. 2 schematically shows in a block diagram form the camera control of the camera of FIG. 1.

Referring now to FIG. 2, shown therein in a block diagram form is a camera control circuit in which the mode set lever 7 is aligned with the indication of "continuous", which means the camera is in the continuous mode for continuous shootings. Under this condition, the camera carries out continuous shootings, that is, successive frames can be exposed in a short period of time which is selectively set by the time set dial 9 while keeping the shutter release button 8 depressed. Specifically, in association with the setting of the mode set lever 7 to the indication of continuous, a changeover switch 15 is brought into a position shown by solid line. Under such condition, while the shutter release button 8 is kept depressed, a circuit for detecting the depression of the shutter release button 8 provides a signal of high voltage level (which is referred to as "H" signal) which is sent to a one-pulse generator 17. At the moment when the one-pulse generator 17 receives an H signal from the circuit 16, the one-pulse generator 17 outputs a pulse of H signal and then holds a signal of low voltage level (which is referred to as "L" signal).

Corresponding to the presence of an H signal from the one-pulse generator 17, a shutter actuating circuit 18 is caused to operate so as to permit the operation of the shutter 19. At the completion of the shutter operation, the shutter actuating circuit 18 correspondingly outputs an H signal which in turn, causes a motor driving circuit 20 to permit the rotation of a motor for the operation of a film winding and shutter charging device 22. As a result, the exposed film 4 is wound around the spool in the film take-up chamber 5 by a frame, while the shutter is charged for the next exposure. When the film winding and shutter charging device 22 has completed the preparatory operation, it outputs an H signal pulse which is applied to a timer 24 through the changeover switch 15. The timer 24 can provide an L signal pulse momentarily when the period of time selected by the time set dial 9 elapses, the L signal pulse being applied to NOR circuit 25 through one of inputs thereof. As NOR circuit 25 at its other input receives an H signal from the shutter release detecting circuit 16 through NOT circuit 26, the NOR circuit 25 can provide an H signal pulse to the one-pulse generator 17 at the provision of an L signal pulse from the timer 24. As a result, the one-pulse generator 17 generates an H signal pulse for repeating the sequence described above. When the operation of the shutter button 8 is discontinued, the sequence is interrupted because of the absence of H signal from NOR circuit 25.

The time set dial 9 can selectively set the interval of time within which a series of successive pictures are taken, for example, 0.5 sec., 1 second and 2 seconds. The resulting interval of time is also transferred to the control circuit 30 through the timer 24. The control circuit 30, which is operable once the mode set lever 7 has been aligned with the indication of "continuous" so as to set the camera to a continuous shooting mode, is actuated by an H signal from the motor driving circuit 20 so as to permit LED 6 to emit light with a duration corresponding to that set by the time set dial 9, and is interrupted by a signal from the film winding-shutter charging device 22 at the end of operation thereof.

On the other hand, when the mode set lever 7 is aligned with the indication of "single", the camera is made operable in a usual mode which permits one exposure for each operation of the shutter release button 8. In the usual mode, the changeover switch 15 is kept in the other position than that shown, and the camera operation is finished at the end of operation of the film winding-shutter charging device 22. After this, no further exposures are made unless the shutter release button 8 is re-operated. It is apparent that LED 6 is not actuated when the mode set lever 7 is in the usual mode.

Figure 3:
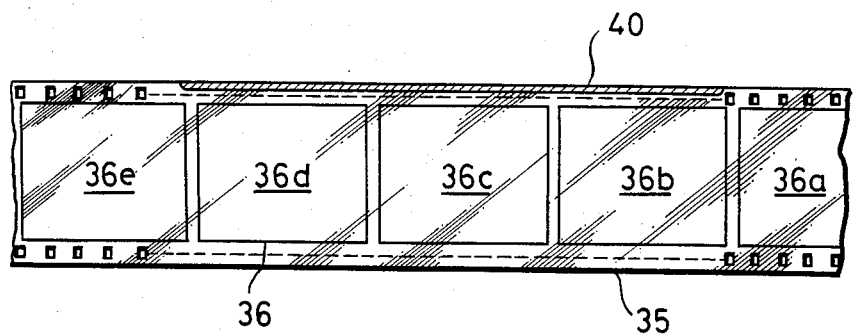
FIG. 3 schematically shows a part of the film, after development, provided by the camera of FIG. 1.
Figure 4:
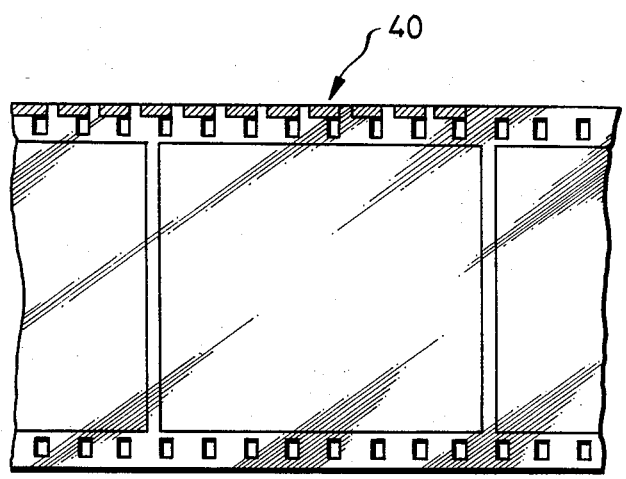
FIG. 4 is an enlarged view showing a part of the film of FIG. 3.

The film 4 on which picture images are formed by the above-mentioned camera has the appearance as shown in FIG. 3. The picture frames 36a–36e include as a part thereof a series of successive picture frames 36b–36d, for example of action sequences, which are effected in a short period of time by the camera set in the continuous mode. Outside the successive picture frames 36b–36d, there is formed a visible line mark or signal 40 which results from the illumination by LED 6 during the continuous shootings as mentioned hereinbefore. The visible line mark 40 can provide the information that the picture frames adjacent to the visible line mark 40 are ones photographed in a short period of time in the continuous shooting mode. Specifically, as shown in FIG. 4, the visible line mark 40 is actually formed as a line of dots arranged at equal distances according to the interval at which the successive shootings are made. From the distance between the dots, the interval at which the successive pictures are photographed can be determined.

Figure 5:
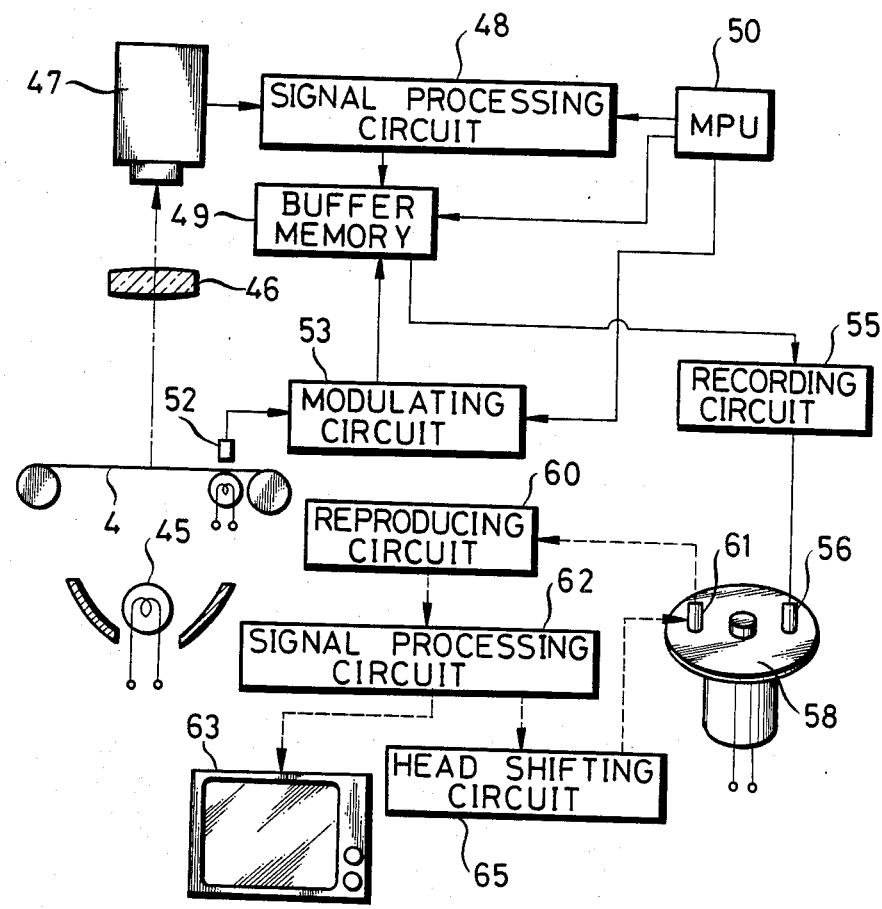
FIG. 5 schematically shows the arrangement of an electronic reproducing system for displaying picture images on a TV screen.

In FIG. 5, showing the outline of an apparatus for converting the picture images into video signals and recording them on a magnetic recording sheet, a frame on the film 4 is illuminated by a light source 45 and picked-up by a video camera having a taking lens 46 with a certain magnification. The video signal from the video camera 47 is supplied to a buffer memory 49 through a signal processing circuit 48. The signal processing circuit 48 and the buffer memory 49 are controlled by a microprocessor unit (MPU) 50.

At this time, the visible line mark 40 representing that the picture is one of a series of successive pictures related to one another is sensed by a photosensor 52 for providing a certain form of mode signal which is supplied to the buffer memory 49 after modulation by a modulating circuit 53. Then the video signal and signal memorized in the buffer memory are restricted under the control of MPU so as to be recorded on the magnetic recording sheet (which is referred to as magnet sheet) 58 with a magnetic head 56 which is controlled by a recording circuit 55.

The magnet sheet 58 on which video signals and mode signals corresponding to the respective picture frames has been recorded is put on a reproducing apparatus and rotated under the same condition as recording. A reproducing circuit 60 retrieves video signals through a magnetic head 61 and supplies video signals to processing circuit 62 in order to provide image signals suitable for a television receiver 63.

In the above-mentioned image reproduction, the video signal from the reproducing circuit 60 includes a continuous mode signal which is modulated to have a frequency band different from that of the video signals and thereby is detected separately from the video signals. When the continuous mode signal is detected, the magnetic head 61 is shifted according to the form of the continuous mode signal under the control of a head shifting circuit 65. As a result, a series of successive images can be reproduced at time intervals corresponding to that at which the series of successive pictures have been photographed. If the magnetic head 61 is shifted at prolonged time intervals by adjusting the head shifting circuit 65, the series of successive images may be reproduced in a slow motion mode.

It may be possible to record continuous mode signals on the cue track which is the 52nd track, disposed close to the center of the magnetic sheet, as well as index signals of the respective still image video signals. As is well known in the art, the magnetic head 61 is adapted to access the cue track first, before all other reproducing operations. Consequently, it is easy to detect which tracks the magnetic head 61 should access successively previous to image reproduction.

Figure 6:
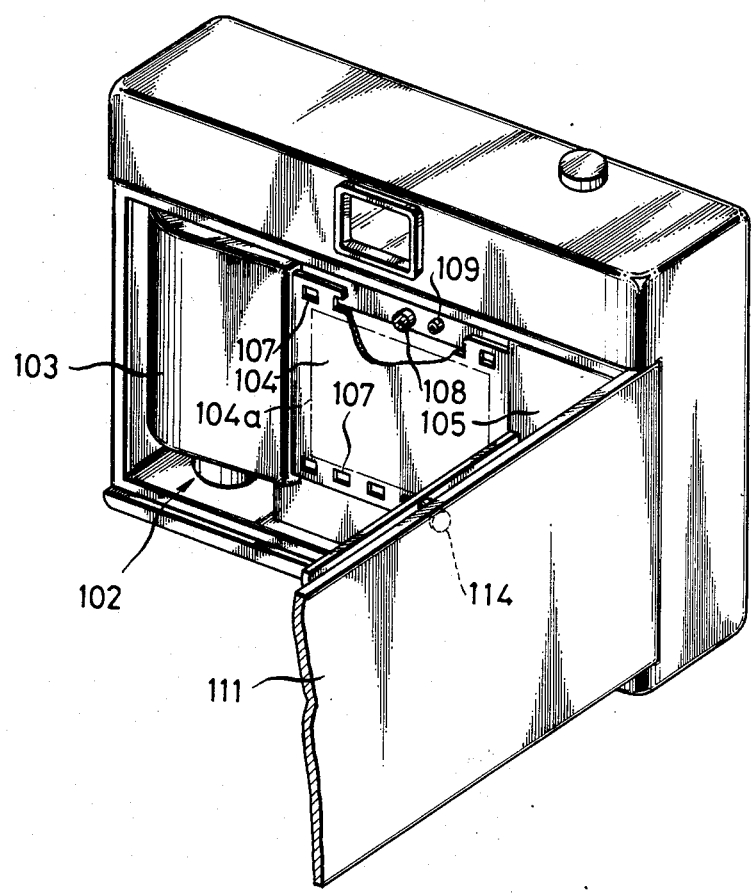
FIG. 6 is a schematic perspective view of a camera according to another embodiment of this invention.

Referring to FIG. 6 to describe a second embodiment of the present invention, there is shown a camera with its back cover opened. The camera, which is of the type having a prewinding feature, is loaded in its film loading chamber 102 with a roll film container 103 in which the 135 size of roll film 104 is contained. The container 103 is provided with a code mark 110 made of electrically conductive materials which is known in the art as a DX code system. The leader of the film 104 previously withdrawn out from the container 103 is automatically wound around a spool 115 (shown in FIG. 7) rotatably mounted in a film take-up chamber 105.

Facing the upper marginal portion of the film 104 where sprocket holes are perforated, the camera body is provided with two light emitting diodes (LEDs) 108, 109, one 108 of which emits light to which the film is insensitive and which is received by a light sensing element 114 in order to detect the number of sprocket holes 107 passed over the LED 108. The other one 109 can emit light to which the film 4 is sensitive and which illuminates the marginal portion outside the picture frame 104.

Figure 7:
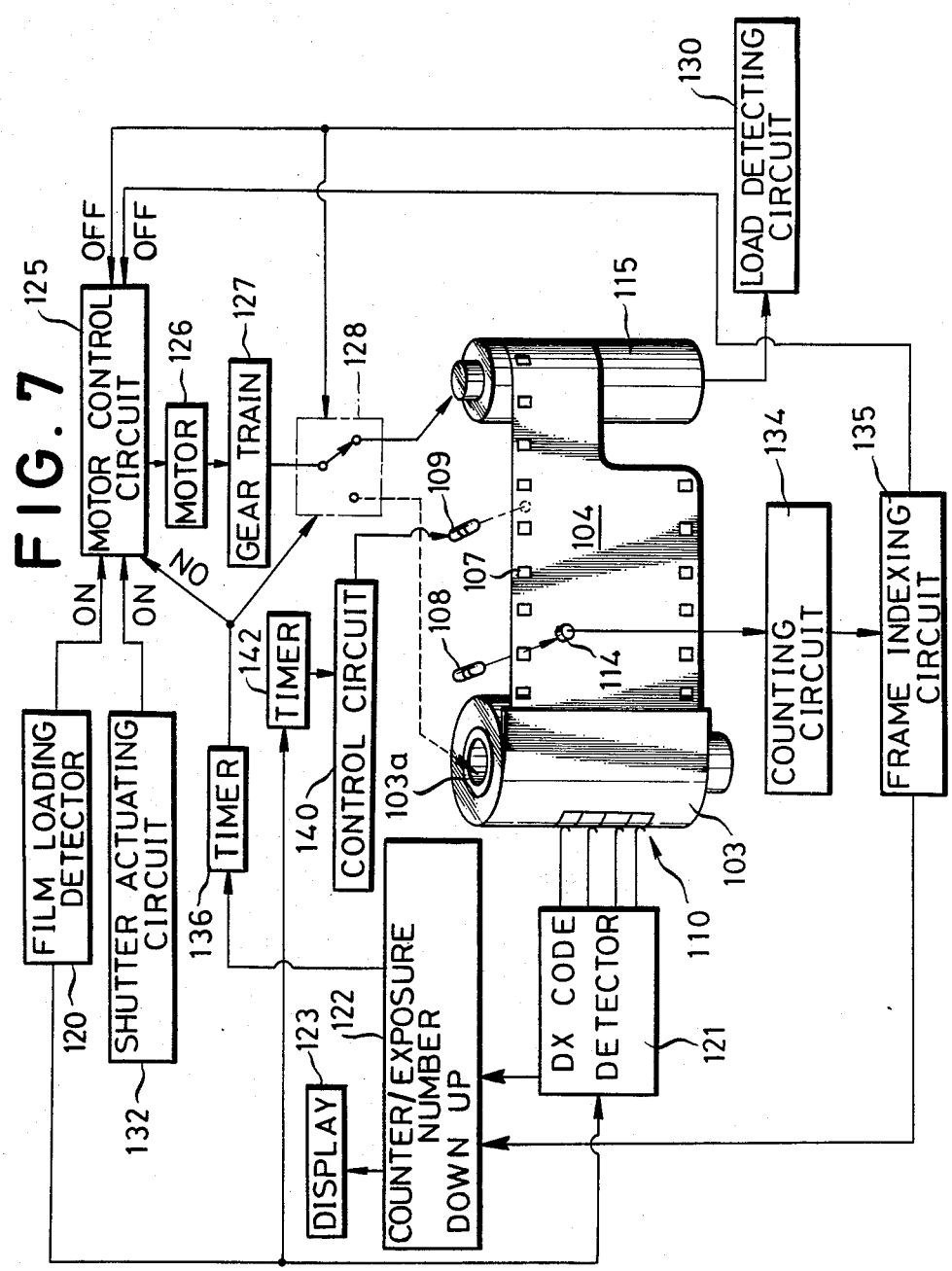
FIG. 7 schematically shows in a block diagram form the camera controls of FIG. 6.

As shown in FIG. 7, the camera is controlled by the control circuit to wind up the film. When closing the back cover 111 after the film container 103 has been loaded, film loading detection means 120 actuates the DX code detector 121 for a predetermined time so as to read the code mark 110 representing the information of film type, film speed, the number of exposure and the like and then to decode for memorizing the respective information. At this time, the number of exposures of the loaded film is stored in a counter 122 and shown on a display 123 comprising, for example, a liquid-crystal device.

A signal from the loading detection means 120 causes the motor control circuit 125 to start the rotation of the motor 126 which is transmitted, through a gear train 127 and a changeover means 128, to the take-up spool 115 for the rotation of the take-up spool 115. At this time, the spool shaft 103a of the film container is operatively disconnected with the motor 126 by the changeover means 128. Consequently, the unexposed film 104 is continuously wound up around the take-up spool 115 and at the end of winding up, an excessive load is exerted on the take-up spool 115 because of the fact that the end of the film 104 is connected to the spool shaft 103a of the container 103. For detecting the excessive load on the take-up spool, there is provided a load detecting circuit 130 which is adapted to provide a signal for stopping the motor when a predetermined excessive load is detected. At this time, the changeover means 128 is switched to the other position connecting to the dotted line.

When taking a photograph, a shutter control circuit 132 is actuated and provides a signal at the end of exposure. The provision of the signal causes the motor 125 to rotate so as to rotate the spool shaft 103a. In such a way, the exposed film 104 is rewound around the spool shaft 103a. During the rewinding, as the light emitting element 108 is illuminating the sprocket holes 107, the light sensing element 114 receives pulsed light through each sprocket hole, which is counted by the counting circuit 134. A frame indexing circuit 135 is actuated one every, for example, eight counts which corresponds to a frame, so as to send a signal to the motor control circuit 125 to stop the rotation of the motor 126. The frame indexing circuit 135 sends a subtraction pulse to the counter 122 to count down the number of exposures by one every exposure.

When the counter 122 shows "0", the timer 136 is automatically actuated for causing the motor control circuit 125 to permit the rotation of the motor 126 for a time previously set to the timer 136 so as to fully rewind the film 4 into the container 103. When the time set to the timer 136 is elapsed, the timer 136 actuates the changeover means 128 to return to its initial position so as to set the camera to its initial conditions after the film container has been removed therefrom.

Figure 8:
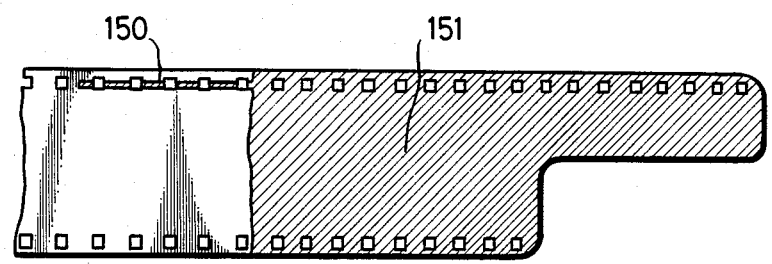
FIG. 8 schematically shows a leading part of the film, after development, provided by the camera of FIG. 1.

According to the present invention, the prewinding type camera is further provided with means comprising a light emitting element 109, a circuit 140 for controlling the energization of the light emitting element 109 and a timer 142 which permits the circuit 140 to act for the period of time to which the timer has been set. The timer 142 starts the counting operation upon receipt of the signal provided from the film loading detection means 120 to allow the energization of the light emitting element 109 so as to emit light to which the upper marginal portion of the film is exposed and thereby forms a latent image thereon. When the film 104 is developed, as shown in FIG. 8, the visible line mark 150 is presented on the film 104 as well as picture images which of course are visual but negative. The length of the visible line mark 150 is dependent on the period of time to which timer 142 is set.

Figure 9:
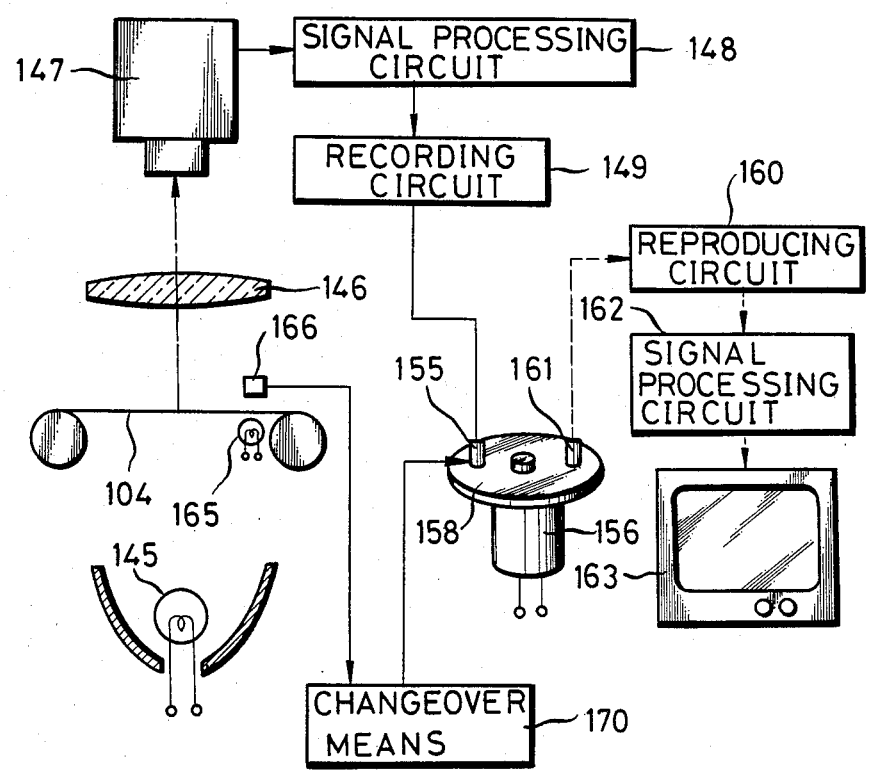
FIG. 9 schematically shows the arrangement of an electronic reproducing system for displaying picture images on a TV screen.

In FIG. 9 showing the outline of an apparatus for picking-up film images and recording video signals of the film images on a magnetic sheet, a picture frame is illuminated by a light source 145 and picked-up by a video camera 147 having a taking lens 146 with a certain magnification. The video signal from the video camera 147 is supplied to a signal-producing circuit 148 and then to a recording circuit 149 which controls the magnetic head 155 to record the processed video signal on the magnetic sheet 158 being rotated by a motor 156. The picture images on the film are usually recorded in the order of the frame number on the magnetic sheet 158 from outside to inside; however, when the line mark 150 is sensed, the magnetic head 155 is controlled to record video signals on the magnetic sheet 158 from the inside track to the outside one. For this purpose, there is provided means for detecting the intensity change of the light passing through the upper marginal portion of the film 104 where a line mark 150 may be formed. The detecting means comprises a light projector 165 and a light receiver 166 which is so disposed as to receive light from the projector 165 passing through the film 104. Since the light receiver 166 is adapted to generate an input corresponding to the light intensity it receives, an output change occurs when the light receiver 166 detects the light passing through the boundary of the end of the line mark 150. Responding to the occurrence of the output change from the light receiver 166, changeover means 170 is actuated for reversing the direction in which the magnetic head 155 is shifted so as to record video signals on the magnetic sheet 158 from an inside track to an outside one. Consequently, the images on the film photographed by the prewinding camera of the invention can be recorded on the magnetic sheet 158 in the reverse order of photographing. This means that the magnetic sheet 158 can provide for the reproduction of images in the photographed order using usual reproducing apparatus. It should be noted that the changeover means 170 may be manually operated upon the visual observation of the line mark 150 on the film 104. In this event, the mark 150 can be formed on not only the end side portion of the film 104 but also the middle portion thereof. Moreover, the visible line mark 150 can comprise a series of dots. Furthermore, the optical mark can be one dot per one frame which is exposed during filming.

What is claimed is:

1. In a camera having a camera body, a shutter and an exposure frame defining an exposure aperture in the camera body at the back of which frame a film having at least one image area on which images are formed by shutter operation is located, the improvement comprising:

light emitting means disposed in said exposure frame for emitting light to which said film is exposed to form on said film at least one optical mark representing a condition of the camera under which said film is exposed;

control means responsive to said condition of the camera and associated with said light emitting means for controlling the emission of light from said light emitting means; and film winding means adapted to continuously wind said film across said exposure frame from the beginning to the end of said film and to rewind said film, frame by frame, one frame being rewound after each exposure by said shutter operation, said light emitting means forming said optical mark indicating that said film has been exposed from the last frame toward the first frame of said film.

2. A camera according to claim 1, wherein said light emitting means is a light emitting diode.

3. A camera as defined in claim 1, wherein said light emitting means is so located within said exposure frame as to form said optical mark on said film and outside said at least one image area of said film.

4. A camera as defined in claim 1, wherein said control means is responsive to said film winding means, such that said control means is actuated at the start of the film winding and allows said light emitting means to emit light onto each said frame exposed during filming.

5. A camera according to claim 4, wherein said control means comprises a timer and allows said light emitting means to emit light for a predetermined period of time as determined by said timer so as to form a certain length of said optical mark.

6. A camera as defined in claim 1, further comprising two light emitting diodes (LEDs), one of said LEDs emitting light to which the film is insensitive, said light being received by a light sensing element, and the other of said light emitting diodes emitting light to which the film in sensitive.

7. A camera as in claim 6, further comprising a counting circuit and a frame indexing circuit, wherein after a predesignated number of counts is sensed by said light sensing element, a signal is set to a motor control circuit to stop a motor by which said film is being rewound frame-by-frame.

8. In a camera having a camera body, a shutter and an exposure frame defining an exposure aperture in the camera body at the back of which frame a film having at least one image area on which images are formed by shutter operation is located, the improvement comprising:

light emitting means disposed in said exposure frame for emitting light to which said film is exposed to form on said film at least one optical mark representing a condition of the camera under which said film is exposed which is used when the images on said film are converted into video signals after development for recording on magnetic recording medium;

control means responsive to said condition of the camera and associated with said light emitting means for controlling the emission of light from said light emitting means; and a user-operated mode setting means for selectively setting said camera to either a continuous shooting mode in which a series of successive exposures are made automatically during said shutter operation; or a single shooting mode in which only one exposure can be made by said shutter operation, said control means being responsive to said mode setting means when said mode setting means is set to the continuous shooting mode, whereby said emitting means forms an optical mark representing said continuous shooting mode.

9. A camera according to claim 8, wherein said control means comprises a timer for establishing time intervals within which a series of successive exposures in said continuous shooting mode is taken, said control means allowing said light emitting means to emit light for a period of time corresponding to said time interval.

10. A camera according to claim 8, wherein said light emitting means is a light emitting diode.

11. A camera as defined in claim 8, wherein said light emitting means is so located within said exposure frame as to form said optical mark on said film and outside said at least one image area of said film.

12. In a camera having a camera body, a shutter and exposure frame defining an exposure aperture in the camera body at the back of which frame a film having at least one image area in which images are formed by shutter operation is located, the improvement comprising: light emitting means disposed in said exposure frame for emitting light to which said film is exposed to form on said film at least one optical mark representing a condition of the camera under which said film is exposed; and control means responsive to said condition of the camera and associated with said light emitting means for controlling the emission of light from said light emitting means, said control means further comprising a shutter release detecting circuit for detecting the depression of a shutter-release button, a one-pulse generator, a shutter actuating circuit, a motor driving circuit, a timer, and a control circuit, wherein said shutter-release detecting circuit provides a high voltage level signal when the shutter is depressed, said one-pulse generator detects said high signal and in turn outputs a high signal pulse and then a constant low voltage signal, said shutter actuating circuit senses said high signal from said one-pulse generator and permits the operation of a shutter, said shutter actuating circuit outputting a high voltage signal when said shutter is released causing a motor driving circuit to permit rotation of a motor to operate a film winding device to rewind said film.

* * * * *